(12) United States Patent
Farlotti et al.

(10) Patent No.: US 11,294,854 B2
(45) Date of Patent: Apr. 5, 2022

(54) METHOD FOR AUGMENTED REALITY ASSISTED DOCUMENT ARCHIVAL

(71) Applicant: NEOPOST TECHNOLOGIES, Bagneux (FR)

(72) Inventors: Laurent Farlotti, Arcueil (FR); Grégory Roman, Fontenay-aux-Roses (FR)

(73) Assignee: QUADIENT TECHNOLOGIES FRANCE, Bagneux (FR)

( * ) Notice: Subject to any disclaimer, the term of this patent is extended or adjusted under 35 U.S.C. 154(b) by 769 days.

(21) Appl. No.: 16/132,080

(22) Filed: Sep. 14, 2018

(65) Prior Publication Data

US 2019/0087429 A1 Mar. 21, 2019

(30) Foreign Application Priority Data

Sep. 15, 2017 (EP) .................................. 17306192

(51) Int. Cl.
*G06F 16/11* (2019.01)
*G06K 9/00* (2022.01)
(Continued)

(52) U.S. Cl.
CPC ............ *G06F 16/113* (2019.01); *G06F 3/167* (2013.01); *G06F 16/13* (2019.01); *G06F 16/93* (2019.01);
(Continued)

(58) Field of Classification Search
CPC .......... G06F 3/167; G06F 16/13; G06F 16/93; G06F 16/113; G06K 9/00469;
(Continued)

(56) References Cited

U.S. PATENT DOCUMENTS 6,775,422 B1 * 8/2004 Altman .................. G06F 16/93
382/305
9,143,638 B2 * 9/2015 King ....................... G06F 16/58
(Continued)

FOREIGN PATENT DOCUMENTS

DE   10 2014 012 186 A1   2/2016

OTHER PUBLICATIONS

European Search Report for EP 17 30 6192, dated Jan. 15, 2018, 3 pages.

*Primary Examiner* — Robert W Beausoliel, Jr.
*Assistant Examiner* — Susan F Rayyan
(74) *Attorney, Agent, or Firm* — Cozen O'Connor (57) ABSTRACT

A method for archiving a document in digital or physical form can be summarized as including: capturing an image of the document by a high resolution camera of a headset, the document comprising index information, recording the captured image of the document in a document database along with the index information, confirming, the archiving of the document in physical form in a folder or a box of a cabinet at a determined physical storage location by detecting the folder or box in a delimited centre portion of a field of view of the high resolution camera of the headset in conjunction with detection of a voiced command or an indication of an identification tag of the folder or the box of the cabinet, and recording the determined physical storage location of the document.

14 Claims, 7 Drawing Sheets

(51) Int. Cl.
*G06F 3/16* (2006.01)
*G06F 16/13* (2019.01)
*G06F 16/93* (2019.01)
*G06T 19/00* (2011.01)
*H04N 5/232* (2006.01)
*H04N 5/76* (2006.01)

(52) U.S. Cl.
CPC ..... *G06K 9/00469* (2013.01); *G06K 9/00483* (2013.01); *G06K 2209/01* (2013.01); *G06T 19/006* (2013.01); *H04N 5/232* (2013.01); *H04N 5/76* (2013.01)

(58) Field of Classification Search
CPC ............ G06K 9/00483; G06K 2209/01; G06T 19/006; H04N 5/76; H04N 5/232
See application file for complete search history.

(56) References Cited

U.S. PATENT DOCUMENTS

| | | | |
|---|---|---|---|
| 9,361,716 B1* | 6/2016 | Erikson | G06T 11/00 |
| 9,551,873 B2* | 1/2017 | Zalewski | G02B 27/017 |
| 10,620,817 B2* | 4/2020 | Green | G06K 9/00671 |
| 10,684,485 B2* | 6/2020 | Stafford | G02B 27/017 |
| 10,776,619 B2* | 9/2020 | Collinson | G06N 20/00 |
| 10,929,666 B2* | 2/2021 | Bossut | G06K 9/00463 |
| 11,125,996 B2* | 9/2021 | Lin | G02B 27/017 |
| 2008/0147325 A1* | 6/2008 | Maassel | G06T 17/05 |
| | | | 702/5 |
| 2009/0077127 A1* | 3/2009 | Henry | G06F 16/93 |
| 2017/0034366 A1* | 2/2017 | Thies | H04N 1/00148 |
| 2017/0236320 A1* | 8/2017 | Gribetz | G06T 19/006 |
| | | | 345/419 |
| 2020/0110468 A1* | 4/2020 | Andres | G06F 16/287 |
| 2021/0074068 A1* | 3/2021 | Spivack | G06T 19/006 |

* cited by examiner

Best Supplier, Ltd
25 Warehouse Road
Billings, Dropshire, England DJ17 9BZ

Invoice

Invoiced to: Neopost Industrie
42-46 av. Aristide Briand
92220 Bagneux – France

Attention: Mr. Dear Customer, Sales Administration

Contract number: BS216 H8K
Invoice number: BS216 9816

Invoice date: Oct 1st, 2017
Payment due" Nov 1st, 2017

Description of services
Period: September

| | | | |
|---|---|---|---|
| Shipping of complete pallets | Qty(units) 288 | per unit 12 £ | Total 3456 £ |
| Picking / preparation | Qty(hours) 48 | Hrrate 7.5 £ | Total 360 £ |
| Total amount due No VAT | | | 3816 £ |

METHOD FOR AUGMENTED REALITY ASSISTED DOCUMENT ARCHIVAL

The present invention refers to an augmented reality (AR) system that can be used to assist an operator in document processing and archival, both in physical and digital form.

Although the volume of physical mail has dropped drastically over the last decade, due to the increasing use of digital technologies, many documents are still sent and received in physical form, and need to be achieved. This is notably the case for invoices, which must be kept for legal reasons, contracts, compliance reports or other kind of correspondence. This is also the case for internally generated documents bearing signatures, which materialize an agreement between two or more parties.

Systems exist to digitalize physical documents, extract specific information from their images and enable business process automation. These systems are intrinsically complex and require a lot of initial training and set-up due to the variety of hardware and software involved, and are costly to operate. Such systems are primarily implemented in large organisations dealing with high volumes of similar documents. However many SMB's and even larger enterprises cannot afford them and rely on manual processing and physical storage, generally in cabinets located close to the concerned clerks, and most often in their office.

The treatment of a physical document follows several steps, from the reception in a mailroom to its archival. For instance, an invoice may remain in process several days, before it is approved, recorded and properly stored. During that period, the invoice may be mixed with other pending documents and uneasy to locate. It might also be required to retrieve the invoice after archival, in case of control or discrepancies. In many cases, an initial check or recheck only requires a glance at the invoice as it is mostly to confirm an information, date or amount. In other cases, an examination of the original document is required.

Invoices are stored according to various criteria, typically in folders or boxes corresponding to different suppliers, but may also be stored in chronological order. Other kinds of documents may be stored by product, project, customer, country, or in any sensible manner. In the absence of the titular clerk, it might be difficult to locate a particular document. The document may also be in process for some reason, and not present where it is supposed to be.

So, there is a need for a system allowing to record essential information about a document, to retrieve an image of the document for a quick check, and to retrieve its location in a physical storage for a more substantial check, which can be easily and flexibly implemented in various office environments without necessitating extensive floor space, training and setup, and is affordable for SMB's.

PRIOR ART

U.S. Pat. No. 6,775,422 describes a storage system is for paper and electronic documents. Electronic documents are acquired or produced to provide one or more real time sequences of electronic documents in one or more real time sequences of date/time instances. Acquired or produced physical documents are added to the front (or the back) of one or more cumulative physical stack. The resulting electronic records uniquely identify the physical locations of the physical documents and the electronic locations of the electronic documents, both in terms of their associated date/time instances. These date/time instances guarantee that virtual sets of related physical documents may be conveniently accessed and physically retrieved, and that corresponding sets of related electronic documents may be immediately displayed and suitably presented.

The system of U.S. Pat. No. 6,775,422 appears not particularly flexible. Physical documents are archived in chronological order. Virtual sets of related physical documents are dispersed in various physical stacks and may not be so conveniently accessed.

US2017034366 describes a method for electronically and physically archiving documents. The invention also relates to a container for carrying out the method. The method includes the steps: of producing a file by recording a digital image of a physical document using a camera, storing at least some information based on this file in an electronic memory; filing the physical document in a container, linking a unique container identification and/or position information of the physical document with the file and/or information stored in the electronic memory, and storing in a database the file and/or information stored in the electronic memory with the link to the container identification and/or position information.

Interestingly, US2017034366 mentions the use of a 3D graph or "augmented reality" view, in order to indicate the vertical position of a physical document in a container. This 3D image is inherently linked to the design of the container. The documents are archived in chronological order. The vertical position of a document is calculated based on the height of previously stored documents.

The systems of US2017034366 and U.S. Pat. No. 6,775,422 are finally quite similar. Storage and retrieval of physical documents involve a significant number of steps and are not particularly user friendly. It is however possible to develop a system much simpler to operate, without some of the drawbacks of the prior art, thanks to a more elaborated use of augmented reality.

OBJECT AND DEFINITION OF THE INVENTION

It is an object of the invention to provide a method and system that can help operators to record enough information about a document for a quick check, and to retrieve its location in a physical storage for a more substantial check.

It is another object of the invention to provide a method and system that does not require additional handling operations and keeps the archival process as close as possible to the existing one.

It is a further object of the invention to provide a method and system which can be easily and flexibly implemented in various office environments without necessitating extensive floor space, training and setup, and is affordable for SMB's.

These objects are achieved by a method for archiving a document in digital or physical form comprising:
- capturing an image of a document with a high resolution camera of a headset connected to a computer, the document comprising index information enabling identification of the document,
- recording the captured image of the document in a document database along with the index information,
- archiving the document in a folder or box of a cabinet at a determined physical storage location and confirming the archival using the headset, and
- recording the determined physical storage location of the document.

The method takes advantage of augmented reality (AR). AR is a live direct or indirect view of a physical, real-world environment whose elements are supplemented by computer-generated sensory input such as sound, images or data. With the help of advanced AR technology (e.g. adding computer vision and object recognition) information about the surrounding real world of the user becomes interactive and digitally modifiable. Information about the environment and its objects is overlaid on the real world.

Advantageously, the method further comprises creating a unique identifier for the document.

At least part of the index information is entered by voicing key words in a microphone of the headset or is automatically extracted from the captured image with an image analysis software.

Preferably, the method further comprising asking for missing index information if said at least part of the index information previously captured is not sufficient for identifying the document.

In one embodiment, when a quick digital check is required, the method further comprises retrieving the recorded image of the document from the document database and displaying the image on an embedded display of the headset.

Advantageously, retrieving of the recorded image of the document comprises entering at least part of the index information by voicing key words in a microphone of the headset and matching said at least part of the index information with documents of the document database.

Preferably, said key words used as index information are one or more of the followings: a supplier name, a contract number, a service period, a recipient department, a reference number or a date.

Preferably, the method further comprises displaying recorded images of documents in sequential order on the embedded display of the headset and navigating through the recorded images to identify the relevant document.

Advantageously, the method further comprises asking for missing index information if said at least part of the index information previously voiced is not sufficient for identifying the document.

Preferably, the method further comprises sending the recorded image of the document by email to a recipient for information or approval and sending the index information or other elements which do not form part of the index information to an enterprise application software of the computer or a remote server.

When a more substantial physical check is required, the method further comprises identifying the document by entering the corresponding index information, displaying on the embedded display of the headset the determined physical storage location of the document, by highlighting or overlaying a virtual artifact onto the corresponding cabinet, folder or box and retrieving the document from the determined physical storage location.

Advantageously, displaying the determined physical storage comprises giving a first indication of direction if said corresponding cabinet, folder or box is not in the direct field of the high resolution camera.

The present invention also concerns a system of archiving a document in digital or physical form for carrying out the previous method.

The system may also indicate where a document belonging to a particular group is to be placed. This is particularly useful in the absence of the titular clerk. Based on the key words spoken by the operator, the system retrieves the location of previously archived documents belonging to the same group and displays it.

BRIEF DESCRIPTION OF THE DRAWINGS

The invention will be described and explained with additional specificity and detail through the use of the accompanying drawings in which.

DETAILED DESCRIPTION OF PREFERRED EMBODIMENTS

Figure 1:
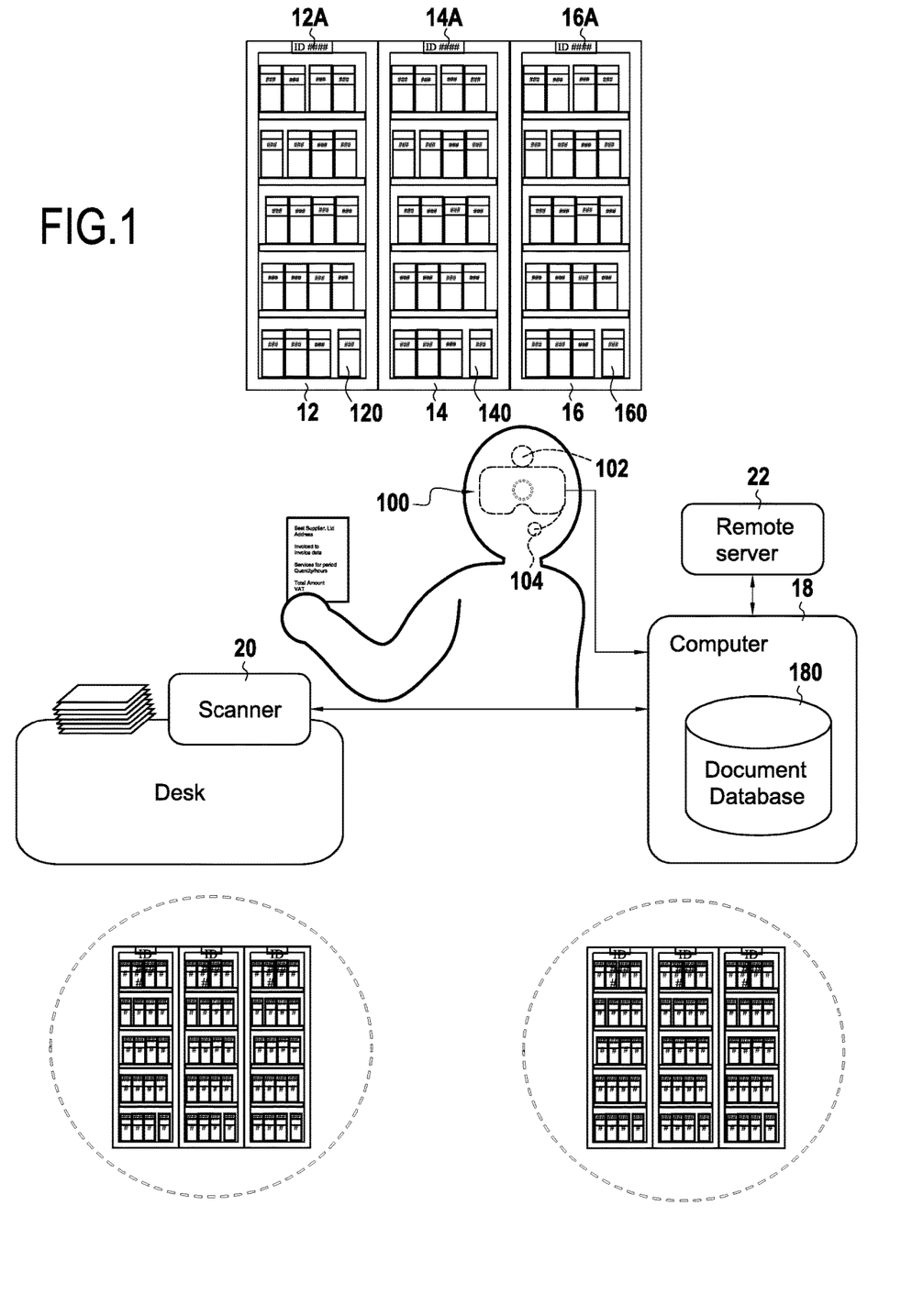
FIG. 1 is a schematic view of a workspace incorporating the system for carrying out the method of the invention.

FIG. 1 is a schematic view of a workspace incorporating the system of the invention. In this example, the workspace is a traditional clerk office, which is not specifically modified to practice the invention. The work space includes several storage cabinets, in a vertical and/or horizontal arrangement. For convenience, only one operator 10 and three cabinets 12, 14, 16 have been represented in details, but the system can be used by several operators concurrently, each wearing an individual headset. The cabinets may be disposed in separate groups, corresponding for instance to distinct departments, subsidiaries, countries or activities. Some of these groups (in dotted circles) may be not in direct line of sight with the operator, or located in other rooms. Basically the system can be adapted to any existing physical arrangement of storage cabinets.

In this example, each of the cabinets 12, 14, 16 contains a plurality of boxes 120, 140, 160 corresponding to suppliers, customers, products or projects. The boxes and optionally the cabinets bear tag identifiers 12A, 14A, 16A. The tags are preferably printed with a name in clear, but may also be printed with a number or barcode ID. The physical arrangement of the cabinets and boxes corresponds to the logical organisation of the archives. The documents sit on the clerk's desk and are usually disposed in one or several stacks or bins, which may correspond to different steps of the process.

The operator 10 wears a headset 100 including a high resolution digital camera 102 and a microphone 104. The headset is connected to a computer 18 containing a document database 180, preferably in a wireless manner, in order to give complete freedom of movement to the operator when roaming through the archives. In a specific embodiment (not illustrated), the headset and the computer (in that case an embedded controller) may be integrated in a single wearable unit. The operator picks the documents on a first come basis, or in sequence. An image of a document is captured by the high-resolution camera. This image capture can be automatic (the system recognises a new document) or triggered by gesture or vocal input. The gesture may be a click on a virtual button or on a small input device (not illustrated) connected to the headset. The vocal input may be a specific vocal command of one of the key words used as index information. Index information (key words) related to the document, such as sender or date, can be input by voice with the microphone 102. Wearing the headset 100, the operator 10 reads aloud the information while or right after an image has been captured. A unique identifier is created by the computer 18 for the document. This document identifier is preferably an automatically generated date/time stamp or a chronological number. The document image is then registered in the document database 180, along with the document identifier and the index information.

The document is then processed as usual, maintained pending for a period of time, and archived when appropriate. When a document is archived, the physical storage location of the document is captured by the headset, recorded in the document database and linked with the unique document identifier. This operation can be performed on the fly as the operator 10 manipulates the documents and there is practically no difference with the usual process. In particular, there is no need to archive documents in chronological order nor to use special containers, and the existing cabinets, folders or boxes can be used.

The workspace may also include a scanner 20 connected to the computer 18 and that is used for various purposes, including recording digital images of certain documents. This may be useful when these documents need to be dispatched by email for information or approval, or duplicated for some reason. However, it is expected that the images captured by the headset 100 are precise enough for information purposes or even for an approval process in most cases.

As presented, the system requires little or no modifications to existing furniture. Generally the cabinets, folders or boxes are already in use and full of documents. In a set-up phase, the locations of the cabinets are "learned" and a 3D model of the operator's environment is built. The spatial layout of the workplace is registered so that a first indication of direction can be displayed even if a given cabinet is not in direct line of sight with the operator or located in another room. This indication may also be given or supplemented by audio messages.

The term "document" shall be interpreted in a broad sense, not to cover only single or few pages documents such as invoices, but also booklets or books for which only an image of the cover is registered.

Figure 2:
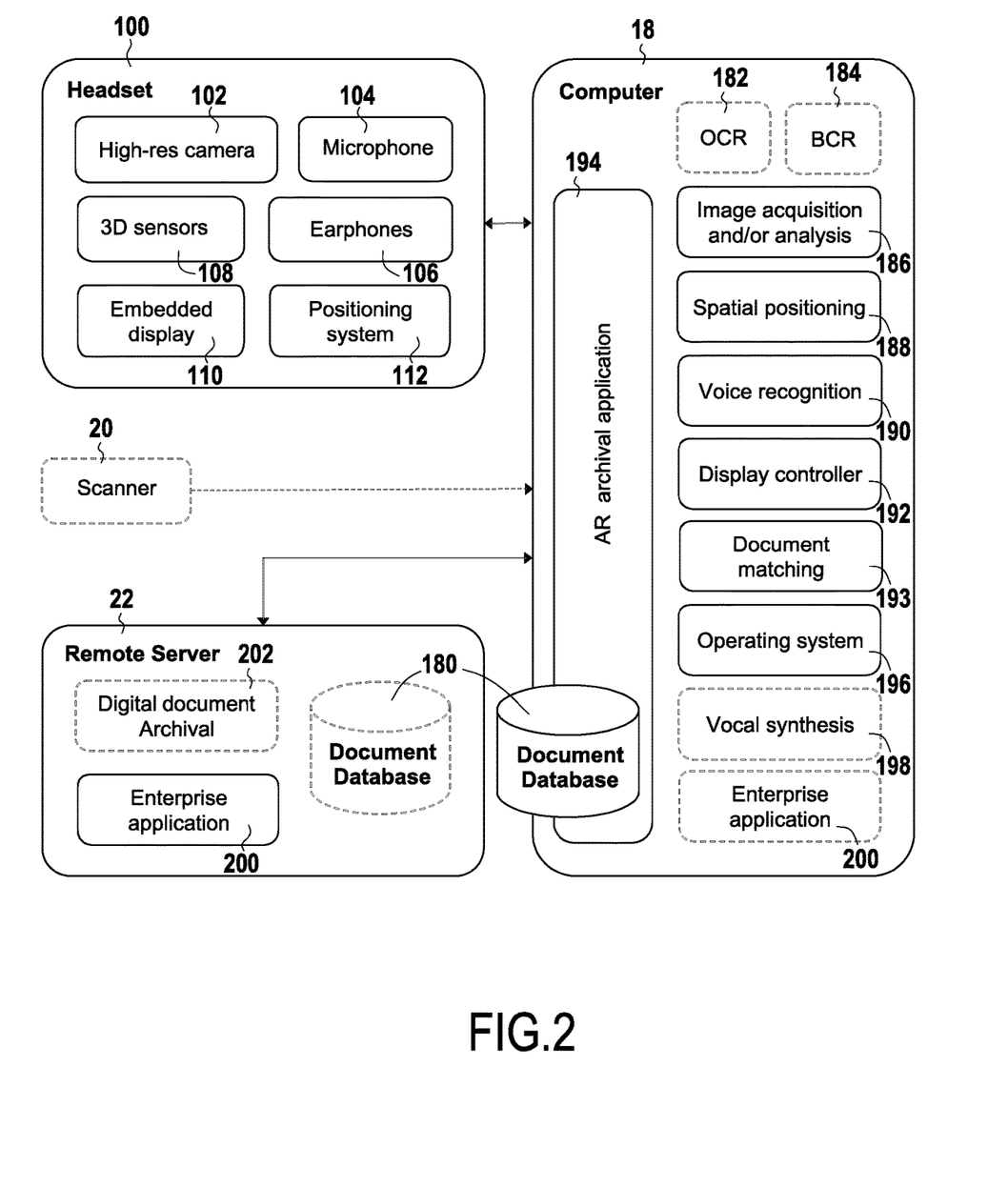
FIG. 2 shows a more detailed view of the system of FIG. 1.

FIG. 2 shows a more detailed view of the system of the invention. The main elements of the system are the headset 100 and the computer 18. The headset is specifically intended for augmented reality and comprises a transparent shield (herein referred as the embedded display) on which virtual artifacts are projected, while the computer may be a generic computer where the various software components necessary to provide augmented reality have been loaded.

The headset 100 includes the high resolution digital camera 102, preferably of 5 megapixels or more, the microphone 104 for vocal input and a pair of earphones 106 for vocal assistance in case some information cannot be conveniently displayed. The headset further includes 3D sensors 108 (for instance infrared sensors) for acquiring the spatial environment of the operator 10, an embedded display 110 for overlaying information on the real word, preferably with a horizontal span of 90° or more. Virtual artifacts are projected on the embedded display at a position corresponding to real objects resting in the operator's view field, the position of the real objects being acquired by the camera 102 and the 3D sensors 108. The headset also includes a positioning system 112, such as a GPS or Wi-Fi positioning system.

The computer 18 includes the document database 180, an OCR software 182 (for optical character recognition), a BCR software 184 (for barcode recognition), an image acquisition and/or analysis software 186, a spatial positioning software 188, a voice recognition software 190, a display controller 192 for the embedded display of the headset, a document matching software 193 for comparing images of documents, a AR archival application software 194 and an operating system 196. Other software components, like for instance a vocal synthesis software 198 or optionally an enterprise application software 200 for accounting or reporting, may be loaded on the computer 18.

Optical character or barcode recognition software 182, 184, are preferably included by default in the computer 18. These may not be useful if no data need to be extracted from the images of documents and the archival process is purely triggered by vocal input. However these may be required to read the tags identifiers 12A, 14A, 16A of the cabinet or boxes, or to perform a match based on image comparison in the document database 180. When the system creates a unique document identifier, index information may be extracted automatically from the image of the document without the operator having to speak key words for example.

The image acquisition and/or analysis software 186 includes a set of libraries for image treatment of a document, like for instance for localization and extraction of the character strings, pictograms or any image element which is required by the AR archival application software 194. The document database 180 contains all information related to the documents. The sets of key words used to identify documents or groups of documents and the logical association with their physical locations are stored in the AR archival application, but can also be recorded in the document database 180.

Spatial positioning software 188 comprises features allowing it to record the positions of the various cabinets and boxes 12, 14, 16. In a set-up phase, the locations of the cabinets are "learned" and a 3D model of the operator's environment is built. The spatial layout of the office is recorded. The computer 18 creates a 3D coordinates systems where the objects captured by the 3D sensors 108 are positioned. The origin of the coordinate system may be an operator desk as illustrated in FIG. 1. Then, all operator displacements from the desk to a given cabinet, and the position of this cabinet in the 3D model, are recorded. The path to this cabinet can be retrieved and indicated to the operator at a later stage. The system may also compare the 3D objects seen by the sensors with the spatial layout previously recorded. This way the position of the operator can be determined whatever the starting point of the displacement, along with the relative position of the cabinets. A first indication of direction can be displayed even if the cabinet is not in direct line of sight with the operator, or located in another room, thanks to the embedded positioning system. This indication can be given or supplemented by audio messages if the system includes the vocal synthesis software 198.

The computer 18 may also be connected to the scanner 20 and to a remote server 22 hosting the enterprise application 200 (if not already present in the computer), to which data extracted by the scanner 20 from the documents are sent. The remote server may also host the document database 180, a separate digital document archival software 202 for storing images of documents recorded by the scanner 20, and/or any required software component which cannot be loaded in the computer. This is particularly useful when the headset and the computer are integrated in a single wearable unit.

Figure 3:
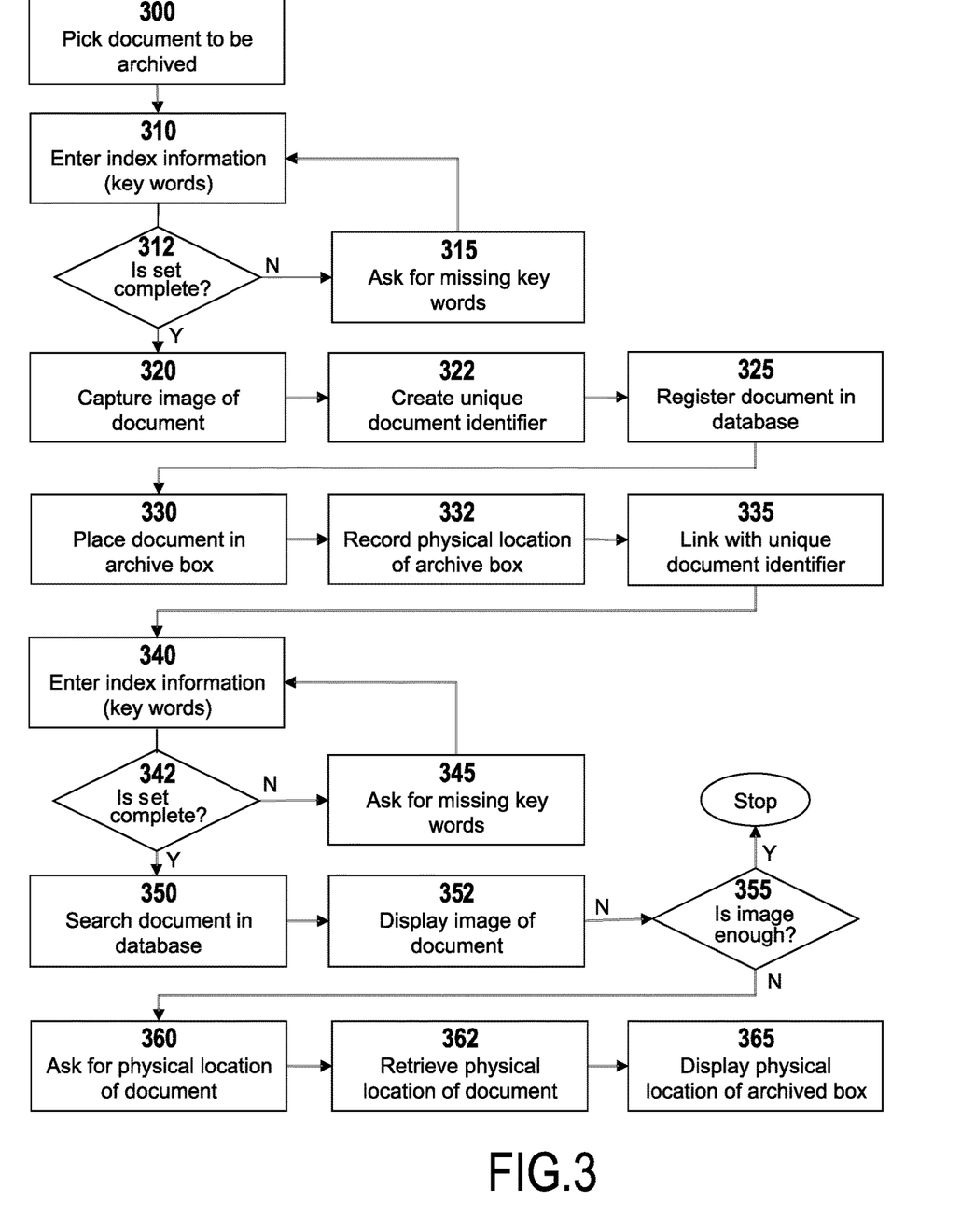
FIG. 3 is a flowchart showing a first embodiment of the method of the invention.

FIG. 3 is a flowchart showing one embodiment of the method of recording and retrieving a document in digital or physical form. A minimal set of key words may be defined for each category of documents in a setup phase. Their number must be high enough to enable identification of each document. Indeed, the system shall be able to retrieve a document in the document database based only on index information (key words) and without reference to its image. Several errors may occur during that process. For instance, the key words may not be audible, or the operator may not enter enough key words or no key words at all. If required, the system may ask the operator to enter more key words till the set is complete.

The operator may also try to record the same document twice, entering either the same or a different set of key words. In the first case, the system signals the double entry to the operator and displays the previously registered image. Then the operator may erase the previous record and register a better image. In the second case, a double entry may be created for the same document, which can be retrieved using one or the other set of key words. Additionally, more than one image may be registered for the same document, for instance if this document includes several pages. However in this case, the use of the scanner 20 will be preferred.

The system can be used by another operator, provided that he or she uses the same kind of index information which was used to record the document. A learning period may be required for the system to take into account the specific pronunciation of an operator, but the length, and even the need of that period may be significantly reduced by the use of the same key words.

At a first step 300, the operator 10 picks a document and holds it in his front of him. An image analysis may be automatically activated after the image is stabilized for a short time of around one second. Alternatively, the image analysis may be triggered by a command voiced by the operator in the microphone 104.

At step 310, the operator 10 enters index information by voicing key words. A test is made at step 312 to determine if the set of key words is complete. If not, the computer 18 asks the operator to enter the missing key words at step 315, until enough key words have been entered. Some of the key words may also be located automatically by an image analysis software 108, as will be further detailed in FIG. 4.

At step 320, an image of the document is captured by the high resolution digital camera 102 of the headset 100. A unique document identifier is created at step 322, and the document image is registered in the document database 180 at step 325, along with the document identifier and the set of key words forming the index information.

The archival can take place immediately after the document has been recorded in the document database 180 or at a later stage. In the second case, the computer must recognize the document first. This is achieved either automatically by image comparison, or asking the operator 10 to enter the same key words as before, or extracting the index information from the image.

At step 330, the document is archived; i.e. the operator 10 places the document in one archive box 120, 140, 160 of a given cabinet 12, 14, 16. The operator confirms the archival of the document using the headset, for instance by pointing a dotted target corresponding to the centre of the view field (such as the target of FIG. 4) on the box and voicing an appropriate command, and/or indicating the ID tag of the box. The physical location of the archive box is automatically captured by the headset, recorded at step 332 and linked to the document identifier at step 335.

The computer 18 may also read the tag identifiers 12A, 14A, 16A of the cabinets or boxes. These indications can be registered during the setup phase and used to verify that a document is placed at the correct location. This can be useful if, for instance, a folder or a box is added into a cabinet. However, in most cases, the right folder or box will be close enough for the operator to find it.

Once a document has been recorded in the document database 180, it can be retrieved by the operator 10 entering the same key words as before according to a vocal input from the operator whenever a quick check, i.e. in digital form only, is required. The computer 18 may ask the operator 10 to enter more key words until the set is complete. The system performs a match in the document database 180 to find out the document corresponding to the same set of key words and displays the recorded image on the embedded display 110 of the headset 100. This recorded image might not be accurate enough to regenerate (e.g. reprint) the document, but enough to verify an information.

At step 340, the operator 10 enters index information by voicing one or more key words used for recording the document. A test is made at step 342 to determine if the set of key words is complete. If not, the system asks the operator to enter the missing key words at step 345.

At step 350, the system search the document database 180 to find out the document corresponding to the same set of key words and displays its image on the embedded display 110 at step 352. If the image is enough for the operator to find the information (test at step 355) he or she is looking for, then the process stops.

Otherwise, if a more substantial check, i.e. in physical form, is required and the operator 10 needs to retrieve the original document, the operator 10 asks at step 360 for the physical location of the document. The system retrieve the physical location recorded at step 362, and displays it by highlighting or overlaying on the embedded display 110 a virtual artifact onto the corresponding cabinet, folder or box where the document is archived at step 365.

Whenever the operator 10 needs to retrieve a physical document already archived, he or she may directly enter the same index information as before and skip the steps 350 to 355. The system performs a match in the document database 180 to find out the document corresponding to the same set of key words. The document is identified and its physical storage location is displayed to the operator, by highlighting or overlaying on the embedded display 110 a virtual artifact onto the corresponding cabinet, folder or box.

Figure 4:
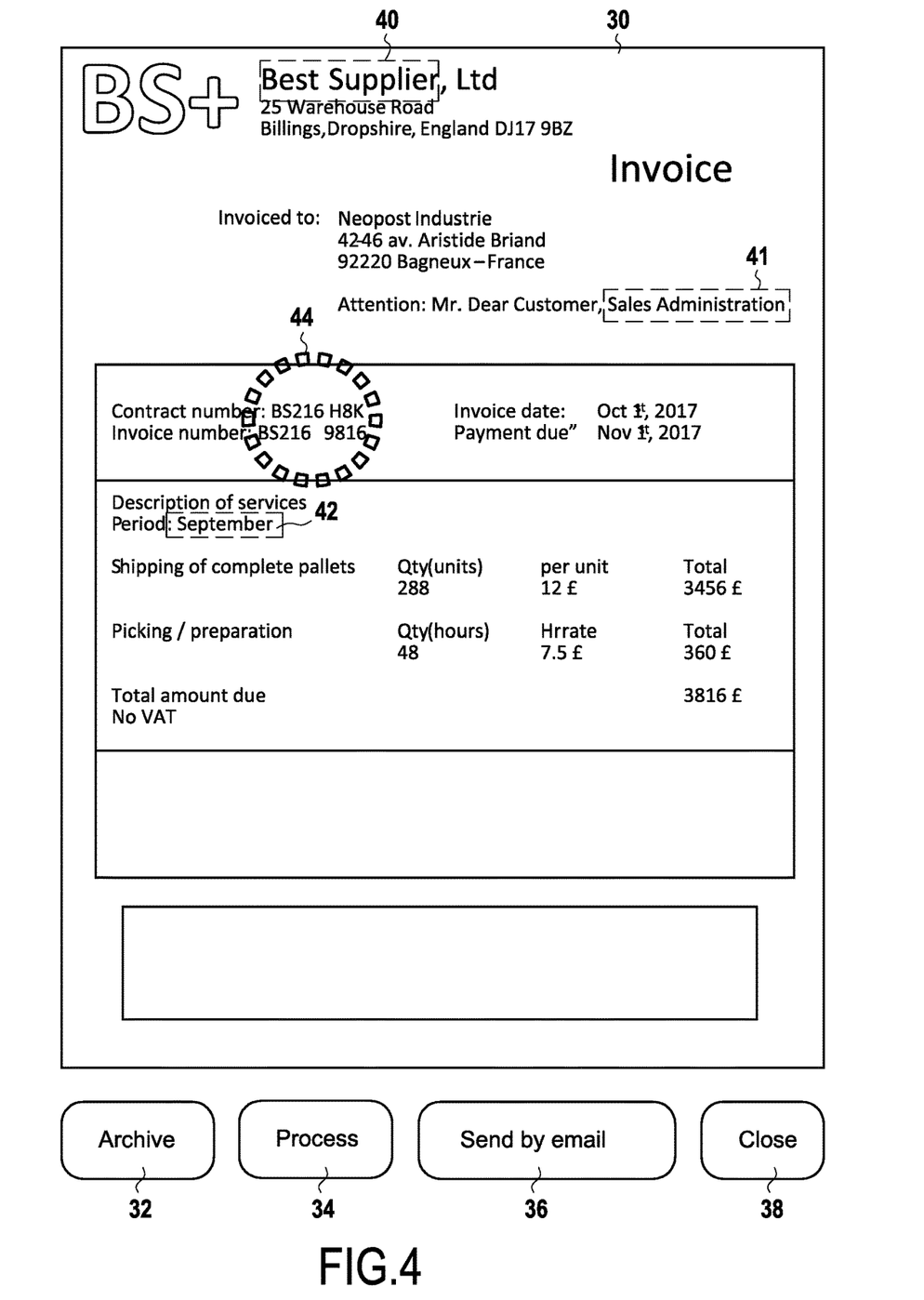
FIG. 4 shows an example of a document as seen with the system of FIG. 1.

FIG. 4 shows an example of a document as seen on the embedded display 110 with the system of the invention, in this case an invoice 30. For illustrative purposes, the appearance of the document is relatively simple, with easily identifiable graphic elements, and the content has no particular meaning. The supplier name, address and logo are in the top left corner. The recipient name, address and department are in the top centre section. The date, description of service provided as well as reference numbers and amounts form the middle section. Virtual buttons 32, 34, 36, 38 are displayed on the embedded display 110 below the document for respectively "archive", "process", "send by email" and "close" the document.

In this example, the key words used as index information are the supplier name; the contract number, the service period and the recipient department. The operator speaks the rest of the key words and the system creates a unique document identifier. It is also possible that the system extracts the index information from the image of the document using the image analysis software 186.

The image analysis software 186 identifies the key words by testing the composition and disposition of the various elements of the image. Once the key words have been located, their position can be confirmed to the operator 10 by highlighting or overlaying on the embedded display 110 a virtual artifact, for instance dotted rectangles 40, 41, 42. If a key word is not located within one or two seconds after the image capture, the operator may move it closer to the centre of view field, represented by a dotted target 44. This dotted target 44 can be displayed continuously or whenever the help of the operator is required to identify or locate an element in the image of the document. The operator 10 may also point this image element with a finger for the high resolution digital camera 102 to locate it.

Terms such as "Urgent" or "Important" may also be recognized by the image analysis software 186 and used to trigger a specific process. By using the virtual button 36 the image of the document may be attached to an email and sent to a specific recipient. By clicking on the virtual button 34, other elements which do not form part of the index information may be extracted from the image of the document and sent to the enterprise application software 200 to be recorded independently from the archival application. These operations may be either performed automatically or triggered by the operator clicking on the virtual button 32.

In other embodiment, no such use is made of image analysis, and the image of the document is simply registered in the document database by clicking on the virtual button 32 or voicing the appropriate command after the key words have been entered.

Once the image has been registered, it can be retrieved and displayed to the operator with the embedded display 110 of the headset 100 using the same key words as index information. The key words can be highlighted in the virtual image of the document. When the operator does no longer need the image, he can close it by clicking on the virtual button 38 or voicing the appropriate command.

The operator may also look for a particular document, but do not remember all the key words used to record it. Or the operator may look for a range of documents, for instance to check if anyone is missing, or to compare numbers over a whole period of time.

Figure 5:
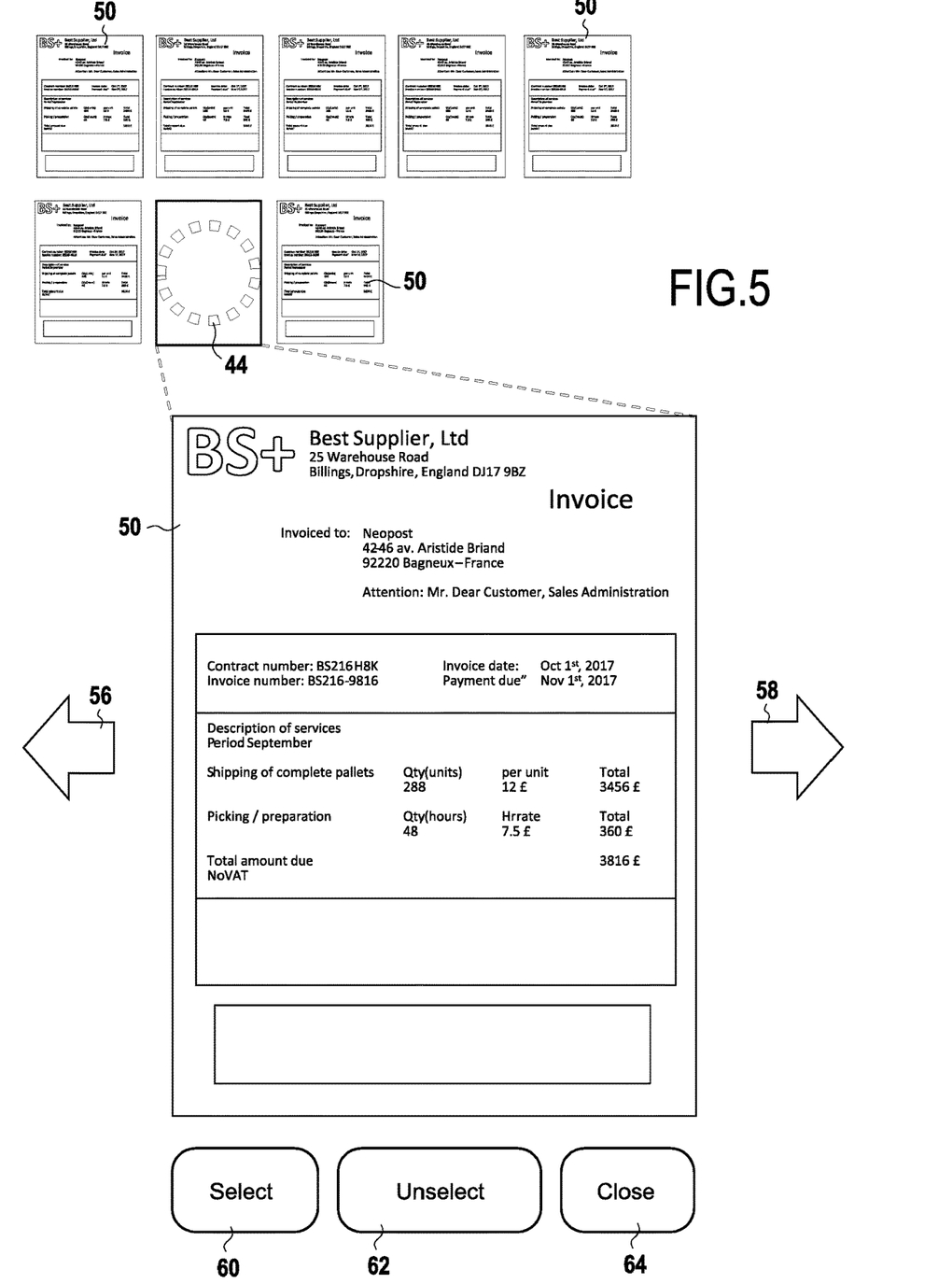
FIG. 5 shows an example of several documents as seen with the system of FIG. 1.

FIG. 5 shows an example of several documents 50 as displayed on the embedded display 110 with the system of the invention. In this example, the operator 10 is looking for one or more documents already recorded in the document database 180, but enters only part of the index information, or specifies a range (typically a date range). The computer 18 will search the documents matching the partial information or range and display them to the operator 10 on the embedded display 110 in sequential order. The operator 10 can then navigate through the different images and select the one(s) 52 he or she is looking for. Navigation can be achieved in different manners, for instance by pointing the dotted target 44 on one document to zoom on it, then zooming of the next or previous document by pointing the dotted target on the corresponding arrows 56, 58, or voicing the word "next" or "previous". The operator 10 may also select, deselect or close the documents by clicking on corresponding virtual buttons 60, 62, 64 or voicing the appropriate words.

Figure 6:
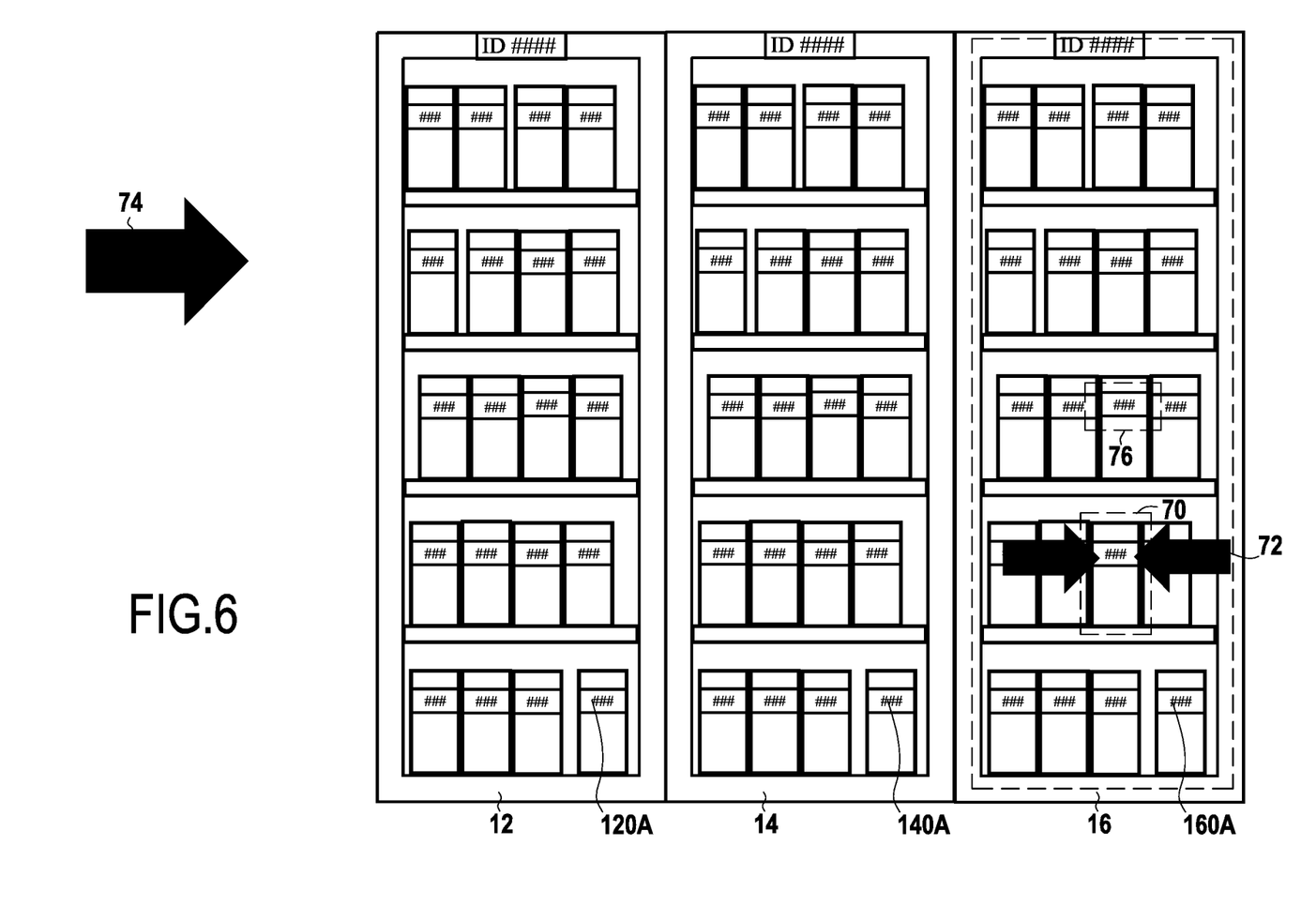
FIG. 6 shows a group of storage cabinet as displayed with the system of FIG. 1.

FIG. 6 shows a group of storage cabinets 12, 14, 16 as seen on the embedded display 110 with the system of the invention. In this example, the operator 10 wants to retrieve a specific document which has been already archived. The operator 10 enters the same index information used to record the document. The computer 18 performs a match in the document database 180 to find out the corresponding document. The document is identified and its physical storage location is displayed to the operator by highlighting or overlaying on the embedded display 110 a virtual artifact onto the corresponding cabinet and box. The virtual artifact can be for instance dotted rectangles 70 or arrows 72. Thanks to the embedded positioning system; another arrow 74 may give a first indication of direction if a given cabinet is not in direct line of sight with the operator 10, or located in another room, This indication may also be given or supplemented by audio messages if the computer 18 includes the vocal synthesis software 198.

As the operator 10 is approaching, the high resolution digital camera 102 of the headset 100 may also read ID tags 120A, 140A, 160A of the boxes. The location of the box is not supposed to have changed since the document was initially archived, but this may happen if for instance, others boxes have been added into a cabinet. However, in most cases, the right box will be close enough for the operator to find it. The computer 18 can then confirm the box into which the document has been archived by highlighting or overlaying on the embedded display 110 a virtual artifact on the ID tag of the box, for instance a smaller dotted rectangle 76.

Similar indications can be provided to show an operator 10 where a document belonging to a particular group is to be archived the first time. Based on the key words spoken by the operator 10 through the microphone 104, the computer 18 performs a match in the document database 180 to find out documents belonging to the same group (i.e. associated to one or more of the same key words), retrieves their physical location and displays it in the same manner on the embedded display 110. However, the actual location of the document is always recorded whether or not the operators follows the indications of the computer 18.

Figure 7:
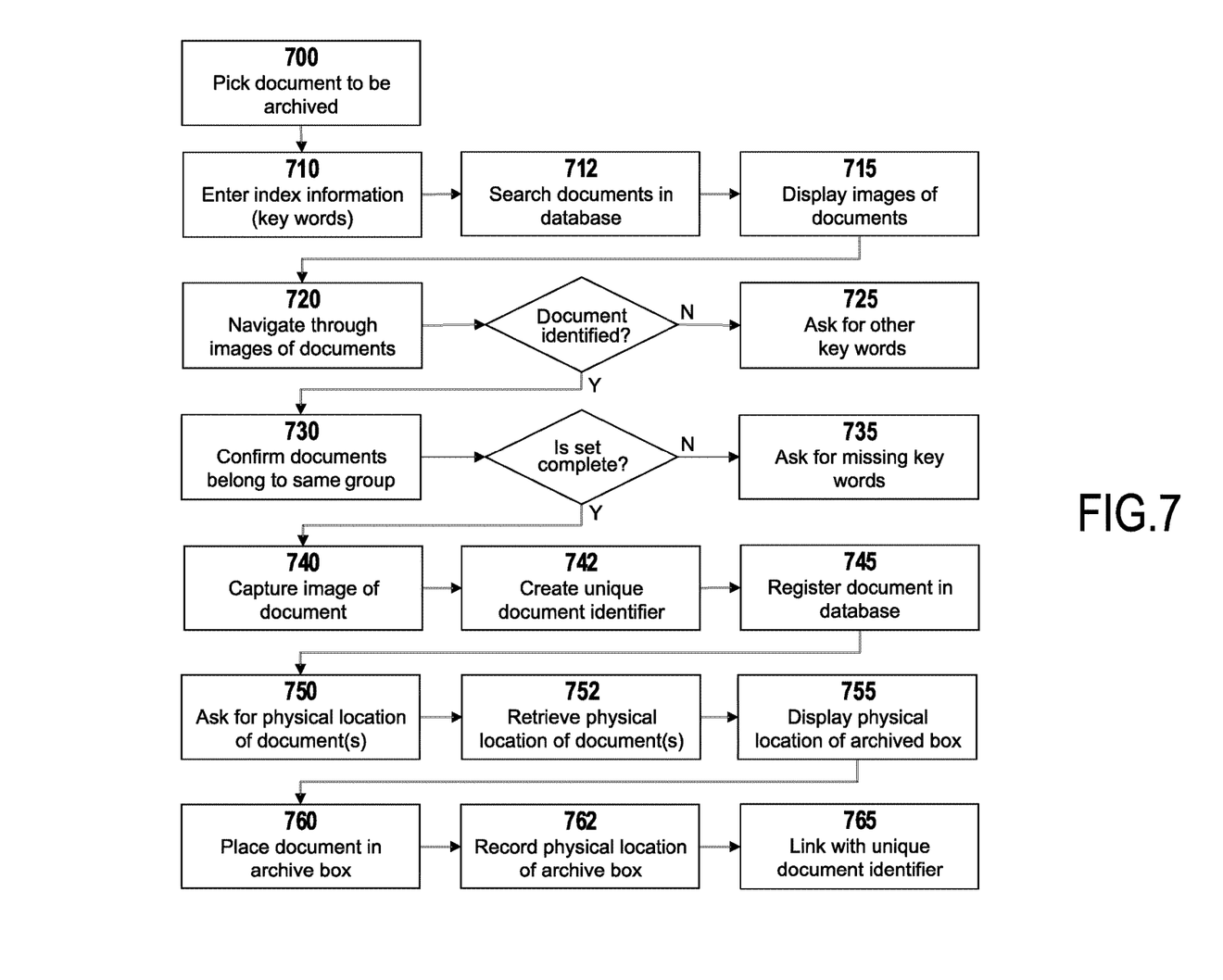
FIG. 7 is a flowchart showing a second embodiment of the method of the invention.

FIG. 7 is a flowchart showing another embodiment of the method of recording and retrieving a document in digital or physical form using the system of the invention. In this situation, the operator wants to archive a document but does not know where the other documents belonging to the same group are located.

At step 700, the operator 10 picks a document and holds it in his front of him. An image analysis may be automatically activated after the image is stabilized for a short time of around one second. Alternatively, the image analysis may be triggered by a command voiced by the operator in the microphone 104.

At step 710, the operator 10 enters part of the index information by voicing one or more key words through the microphone 104. At step 712, the system search the document database 180 to find the documents already archived which correspond to the set of key words and displays their images on the embedded display 110 at step 715. Some of the key words may also be located automatically by the image analysis software 186, and/or the search performed by the document matching software 193.

At step 720, the operator 10 navigates through the images displayed on the embedded display 110 to identify documents belonging to the same group as the one he wants to archive. If at least one document belonging to the same group is identified at step 722, then the process continues to step 730. Otherwise the operator 10 is asked to enter other key words at step 725.

At step 730, the operator 10 confirms that the document belongs to the group identified at step 722. A test is made at step 732 to determine if the set of key words required for that group of documents is complete. If not, the computer 18 asks the operator to enter the missing key words at step 735, until enough key words have been entered.

At step 740, an image of the document is captured by the high resolution digital camera 102 of the headset 100. A unique document identifier is created at step 742, and the document image is registered in the document database at step 745, along with the document identifier and the set of key words.

At step 750, the operator 10 asks for the physical location of the documents belonging to the same group and already archived. At step 752, the computer 18 retrieves the physical location of the document identified at step 722 and displays it by highlighting or overlaying on the embedded display 110 a virtual artifact on the corresponding box where the document is archived at step 755.

At step 760, the operator 10 places the document he wants to archive in the box indicated at step 755 and confirms the archival using the headset. The physical location of the document is recorded at step 762 and linked to the document identifier at step 765.

It is important to note that FIGS. 1 to 7 above are only illustrative. Many variations are possible whiteout departing from the scope of the invention. For instance, the headset 100 and the computer 18 may be integrated in a single wearable unit, which may be in wireless connection with the remote server 22 hosting the document database 180. The enterprise application software 200 and/or any required software component cannot be loaded in the headset 100.

Other elements which do not form part of the index information may be extracted from the image of the documents and sent with the index information to the enterprise application software 200 located in the computer 18 or the remote server 22 directly from the headset 100 to be recorded independently from the archival application. Images of the documents may also be attached to an email and sent to a specific recipient for information or approval directly from the headset 100.

The logical and/or physical organisation of the archives may be different from the ones described. The method steps described in FIGS. 3 and 7 may also be performed in a slightly different order.

What is claimed is:

1. A method for archiving a document in digital form in conjunction with an archiving of a document in physical form comprising:
    capturing an image of the document by a high resolution camera of a headset connected to a computer, the image comprising the digital form of the document, the document comprising index information enabling identification of the document,
    recording, by the computer, the captured image of the document in a document database along with the index information,
    confirming, by the computer, the archiving of the document in physical form in a folder or a box of a cabinet at a determined physical storage location by detecting the folder or box in a delimited centre portion of a field of view of the high resolution camera of the headset in conjunction with detection of a voiced command or an indication of an identification tag of the folder or the box of the cabinet,
    recording, by the computer, the determined physical storage location of the document; and
    further comprising identifying the document, by the computer, based on entered corresponding index information, displaying on an embedded display of the headset the determined physical storage location of the document, by highlighting or overlaying a virtual artifact onto the corresponding cabinet, folder or box to provide a prompt for retrieving the document from the determined physical storage location.

2. The method of claim 1, further comprising creating, by the computer, a unique identifier for the document.

3. The method of claim 1, further comprising receiving via the microphone of the headset at least part of the index information in the form of voiced key words.

4. The method of claim 3, wherein said key words used as index information are one or more of the following: a supplier name, a contract number, a service period, a recipient department, a reference number or a date.

5. The method of claim 3, further comprising asking, by the computer, for additional index information if said at least part of the index information previously voiced is not sufficient for identifying the document.

6. The method of claim 1, further comprising automatically extracting, by the computer, at least part of the index information from the captured image with an image analysis software executed by the computer.

7. The method of claim 6, further comprising asking, by the computer, for additional index information if said at least part of the index information previously captured is not sufficient for identifying the document.

8. The method of claim 1, further comprising retrieving, by the computer, the recorded image of the document from the document database and displaying the image on the embedded display of the headset.

9. The method of claim 8, wherein retrieving of the recorded image of the document comprises receiving via the microphone of the headset at least part of the index information as voiced key words and matching, by the computer, said at least part of the index information with documents of the document database.

10. The method of claim 9, further comprising causing, by the computer, a displaying of recorded images of documents in sequential order on the embedded display of the headset and navigating through the recorded images to identify the relevant document.

11. The method of claim 1, further comprising sending, by the computer, the recorded image of the document by email to a recipient for information or approval.

12. The method of claim 1, further comprising sending, by the computer, the index information or other elements which do not form part of the index information to an enterprise application software of the computer or a remote server.

13. The method of claim 1, wherein displaying the determined physical storage comprises causing, by the computer, the giving a first indication of direction via the headset if said corresponding cabinet, folder or box is not in the direct field of the high resolution camera.

14. A system of archiving a document in digital form in conjunction with an archiving of a document in physical form, the system comprising:
    a headset including a high resolution camera, an embedded display, and a microphone;
    a computer communicatively coupled to the headset, wherein
    the high resolution camera of the headset captures an image of the document, the image comprising the digital form of the document, the document comprising index information enabling identification of the document,
    the computer records the captured image of the document in a document database along with the index information,
    the computer confirms the archiving of the document in physical form in a folder or a box of a cabinet at a determined physical storage location by detection of the folder or box in a delimited centre portion of a field of view of the high resolution camera of the headset in conjunction with detection of a voiced command or an indication of an identification tag of the folder or the box of the cabinet, and the computer records the determined physical storage location of the document on a 3D model of an operator's environment including the locations of the cabinets and document boxes or folders and linking to a document identifier;

the computer identifies the document based on the index information; and the embedded display of the headset displays the determined physical storage location of the document, by highlighting or overlaying a virtual artifact onto the corresponding cabinet, folder or box to provide a prompt for retrieving the document from the determined physical storage location.

\* \* \* \* \*